Dec. 26, 1933.  C. E. SIEGFRIED  1,941,420
PROCESS FOR MANUFACTURING MOLDED PRODUCTS
Filed Feb. 21, 1930
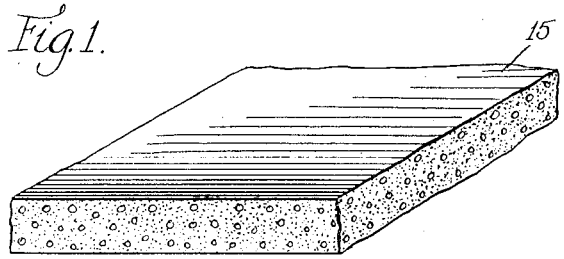
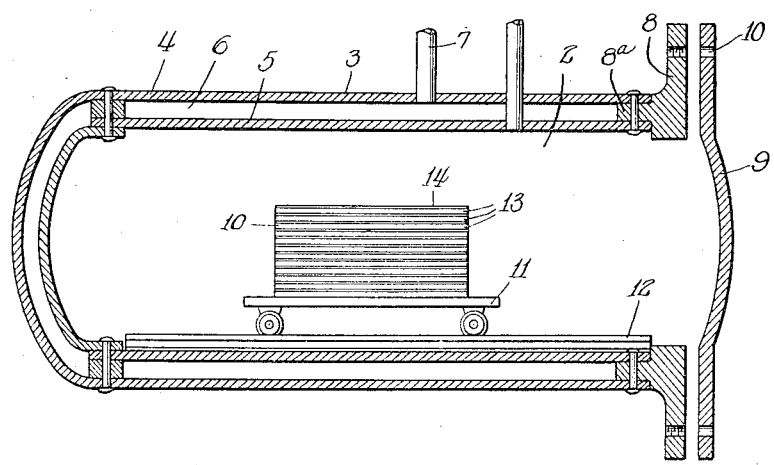
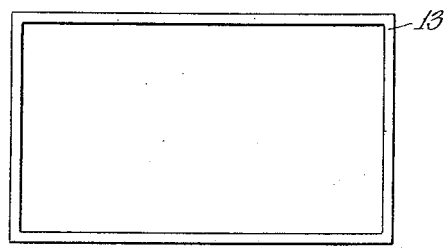
Inventor:—
Clarence E. Siegfried
By Albert F. Robinson
Atty.

Patented Dec. 26, 1933

1,941,420

UNITED STATES PATENT OFFICE 1,941,420

PROCESS FOR MANUFACTURING MOLDED PRODUCTS

Clarence E. Siegfried, Sandusky, Ohio, assignor, by mesne assignments, to Construction Materials Patents, Inc., a corporation of Ohio Application February 21, 1930. Serial No. 430,268

10 Claims. (Cl. 18—53)

The invention relates to apparatus and method for fabricating cellular, sponged slabs, sheets or the like from plastic compositions, and particularly pertains to an apparatus and method by means of which said slab, sheets or the like may be completely and thoroughly sponged, and then immediately vulcanized to retain them in their sponged condition.

In sponging and curing plastic articles, such as rubber, some gas forming means is usually included in the composition and reacts under heat to generate gas which permeates through said composition and expands, if in a cellular character. The products are fabricated in molds which contain a sufficient quantity of the composition to expand and fill them during vulcanization. Since the molds are only incompletely filled, air is contained therein which must be forced out by the composition while the sponging is taking place. This retards sponging of the material, and it frequently is partially vulcanized or set before the sponging is complete, thereby producing products which are only partially sponged.

The object of the present invention is to provide means which remove the air from the molds and vulcanizer, and creates a condition wherein there is no resistance to the expansion of the material to a cellular sponge-like structure.

In the drawing:—

Fig. 1 is a perspective view of a slab, sheet or the like sponged in accordance with the present invention;

Fig. 2 is a view in vertical of a vulcanizer; and

Fig. 3 is a plan view of a frame member in which the slabs, sheets or the like may be molded between plates.

Referring to the drawing, numeral 2 designates a steam vulcanizer comprising casing 3 which may be advantageously formed with two concentric wall casings 4 and 5. These are spaced to provide a steam chamber 6 into which steam may be led through conduit 7. One end of the chamber is headed with a flanged collar clamped between the casing walls by means of an annular flange 8a. To the flanged collar, any suitable closure cap 9 may be attached by means of bolts inserted through perforations 10 in the collar and closure.

Leading into the interior of the chamber of the vulcanizer through the casing walls, is a conduit 11 connected with a compressor or other means for creating a vacuum within the vulcanizer.

The material to be sponged may be represented by reclaimed rubber which is suitably compounded and placed in molds 10 and stacked on a truck 11 for conveyance in and out of the vulcanizer on track 12. Obviously any other vulcanizer, in the form of a chamber or vulcanizing press may be employed. Also, any suitable molding means may be employed. Suitable ones for the purpose of illustration are represented by frame members 13 which are stacked alternately with plates 14. Within the frame members and between the plates, the material to be sponged may be contained. This is expanded or sponged into a strip 15 of cellular construction in which the cells are uniformly distributed. The weight of the molds is ordinarily sufficient to keep the plates from separating during expansion of the mixture, if the molds are not filled with excess material. However, the stack may be weighted down if necessary to prevent any separation of the molds.

It will be understood that the above illustrated apparatus and means for forming the sponged products may be changed in various details of construction without departing from the spirit of the invention.

I claim:

1. A process for expanding and sponging molded products characterized by preparing a plastic mixture containing a gas forming element, feeding the mixture to a vulcanizer, and forming a vacuum in the vulcanizer concomitantly with vulcanization.

2. A process for expanding and sponging molded products characterized by preparing a plastic mixture feeding the mixture to a vulcanizer, expanding the mixture to a cellular character, and creating a vacuum in the vulcanizer concomitantly with vulcanizing.

3. A process for expanding and sponging molded products characterized by preparing a plastic mixture, placing the mixture in a mold, and creating a vacuum in the mold concomitantly with vulcanizing.

4. A process for expanding and sponging molded products characterized by preparing a plastic mixture, placing the mixture in molds, stacking the molds one above the other, feeding the stack to a vulcanizer, and creating a vacuum in the molds concomitantly with vulcanizing.

5. A process for expanding and sponging molded products comprising preparing a plastic mixture adapted to be sponged, feeding the mixture to a chamber, creating a vacuum in the chamber, and causing the products to be cured in the vacuum chamber.

6. A process for expanding and sponging molded products comprising preparing a plastic mixture, feeding the mixture to a chamber, causing the mixture to be expanded to a cellular form, creating a vacuum in the chamber, and curing the expanded mixture.

7. A process for expanding and sponging rubber products characterized by preparing a plastic mixture containing a gas forming element, feeding the mixture to a vulcanizer, and forming a vacuum in the vulcanizer concomitantly with vulcanization.

8. A process for expanding and sponging rubber products characterized by preparing a plastic mixture, feeding the mixture to a vulcanizer, expanding the mixture to a cellular character, and creating a vacuum in the vulcanizer concomitantly with vulcanizing.

9. A process for expanding and sponging rubber products characterized by preparing a plastic mixture, feeding the mixture to a vulcanizer, expanding the mixture to a cellular character, and creating a vacuum in the vulcanizer concomitantly with vulcanizing.

10. A process for expanding and sponging rubber products characterized by preparing a plastic mixture, placing the mixture in molds, stacking the molds one above the other, feeding the stack to a vulcanizer, and creating a vacuum in the molds concomitantly with vulcanizing.

CLARENCE E. SIEGFRIED.